United States Patent [19]

Cocca

[11] 3,806,629

[45] Apr. 23, 1974

[54] CROSSOVER JUNCTION

[75] Inventor: Theodore Cocca, Everett, Mass.

[73] Assignee: Spacetac Incorporated, Bedford, Mass.

[22] Filed: July 3, 1972

[21] Appl. No.: 268,493

[52] U.S. Cl. .................. 174/68.5, 29/625, 117/212, 317/101 CE

[51] Int. Cl. ............................................ H05k 3/12

[58] Field of Search 174/68.5; 317/101 CC, 101 CM, 317/101 CE, 101 A; 117/212; 29/625

[56] References Cited

UNITED STATES PATENTS 3,377,513 4/1968 Ashby et al.................. 317/101 CE 3,560,256 2/1971 Abrams ................ 317/101 CC UX

*Primary Examiner*—Darrell L. Clay

*Attorney, Agent, or Firm*—Joseph S. Iandiorio

[57] ABSTRACT

A crossover junction for miniaturized circuit construction including a first conductor mounted on a support layer, an insulator layer having a first section covering the length of the first conductor in the area of the junction and overlapping onto the support layer to form second and third sections on either side of the first conductor, each of the second and third sections of the insulating layer having a serrated outer edge, and a second conductor extending along the support layer transverse to the first conductor and extending across the insulating layer over the serrated edges.

9 Claims, 14 Drawing Figures

CROSSOVER JUNCTION

FIELD OF INVENTION

This invention relates to an improved crossover junction for miniaturized circuits, and more particularly to such a junction in which the intermediate insulator layer has serrated edges.

BACKGROUND OF INVENTION

A crossover junction is formed in a miniaturized circuit layer when one conductor on a support layer or substrate must cross over a second conductor without making electrical contact. Typically such a junction is formed using an intermediate layer of insulation. At the point where the second conductor runs up and over on either side of the insulator there often occur holes in the second conductor apparently due to wetting, shrinkage and surface tension characteristics of the second conductor. These holes range in size from very small holes which increase the conductor resistance to very large holes which cause the conductor effectively to be an open circuit. In cases where the circuit is solder dipped these holes may be essentially bridged by the solder but in cases where solder dipping is not in the design of the circuit the open circuit remains uncorrected. The sharp corner at the edge of the insulator seems to be a contributor to this problem; thus one approach has included permitting the corner of the edge of the insulator layer to slump down and modify its sharpness but this has been found to be insufficient. It has also been suggested that the insulator layer be constructed with a less steep edge. However the cost of reducing the slope of the edge and making it more gradual is the increased area thereby required on the support layer. Increasing the area required on the support layer is of course contrary to the goal of miniaturization. And there may be required additional fabrication steps to build up the necessary sloped profile.

SUMMARY OF INVENTION

It is therefore an object of this invention to provide an improved crossover junction which prevents shrinkage of the top conductor about the corners of the insulator layer, which normally results in holes and open circuit conditions in the conductor, without significantly increasing the area of or fabrication steps required to form the crossover junction.

It is a further object of this invention to provide an improved crossover junction in which the intermediate insulator layer has serrated edges.

The invention results from the discovery that a serrated edge formed of semi-solid material spreads out or slumps more than a straight edge because of the lesser constraint on salient portions thereof by neighboring areas, i.e., a straight edge can only slump in one direction perpendicular to its edge whereas a hump or tooth can spread out not only in the direction of its peak but also to the left and right of it, and thus a serrated edge can provide a more gradual slope to prevent holes from forming without requiring more area or additional fabrication steps.

The invention features a crossover junction for miniaturized circuit construction including a first conductor mounted on a support layer and an insulator layer on top of the first conductor. The insulator layer has a first section covering the length of the first conductor in the area of the junction and overlapping onto the support layer to form second and third sections on either side of the first conductor. Each of the second and third sections of the insulator layer have a serrated edge. The second conductor extends along the support layer transverse to the first conductor and extends across the insulator layer over the serrated edge.

DISCLOSURE OF PREFERRED EMBODIMENT

Other objects, features, and advantages will occur from the following description of a preferred embodiment and the accompanying drawings, in which.

Figures 1, 3, 4:
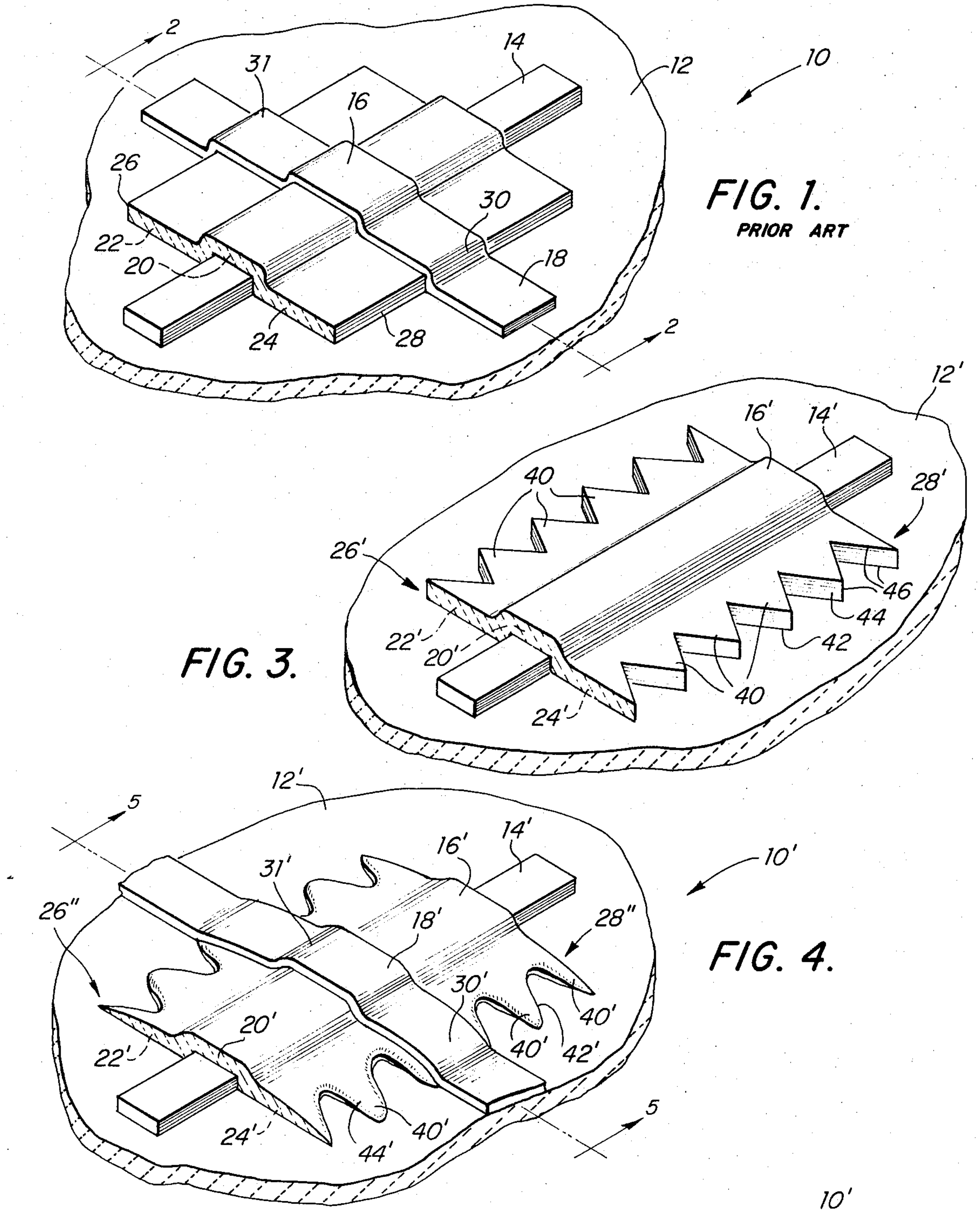
FIG. 1. PRIOR ART, FIG. 3., FIG. 4.
FIG. 1 is an axonometric view with parts shown in cross-section of a broken away portion of a miniaturized circuit showing a typical crossover junction.
FIG. 3 is an axonometric view with parts shown in cross-section of a portion of a crossover junction showing the intermediate insulator layer with serrated edges as it is deposited on the support layer according to this invention.
FIG. 4 is an axonometric view with parts shown in cross-section of the portion of the crossover junction shown in FIG. 3 with a crossover conductor added as it appears a short time after the serrated edge has sunk and the material of the intermediate insulator layer has slumped over.
Figure 2:
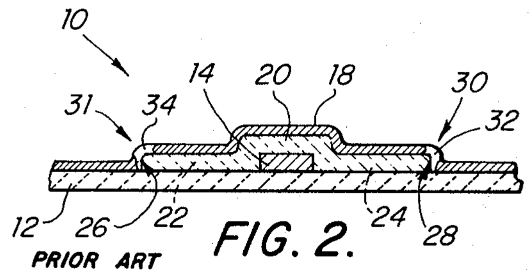
FIG. 2. PRIOR ART
FIG. 2 is a schematic cross-sectional view taken along lines 2—2 of FIG. 1 through a typical crossover junction illustrating the holes which may be created in the top conductor of conventional crossover junctions.
Figure 5:
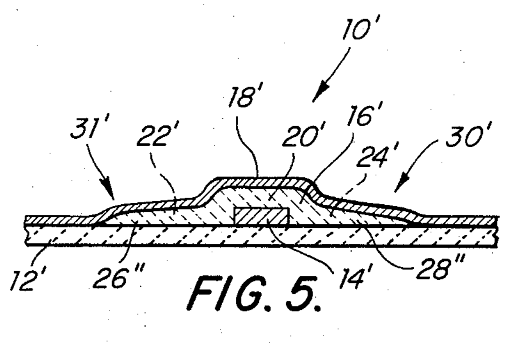
FIG. 5 is a schematic cross-sectional view taken along lines 5—5 of FIG. 4 illustrating the gradual slope provided to the intermediate insulator layer according to this invention which prevents holes from forming in the top conductor.

There is shown in FIG. 1 a typical crossover junction 10 mounted on a support layer or substrate 12. Crossover junction 10 includes a first conductor 14 mounted directly on substrate 12, an intermediate insulator layer 16 extending over first conductor 14 and resting on substrate 12 on either side of conductor 14 and a second conductor 18 which extends along substrate 12 transverse to first conductor 14 and crosses it in the area over intermediate insulator layer 16. The intermediate insulator layer 16 includes three sections, a first section 20 on top of conductor 14 and second and third sections 22 and 24 supported on substrate 12 on either side of conductor 14. The outer edges 26 and 28 of sections 22 and 24 are steep and it is in these sections that the holes occur in top conductor 18 apparently due to the wetting, shrinkage and surface tension characteristics of the material used to make conductor 18. Typically such junctions are made using standard thick film conductor paste such as pallidium gold paste such as those sold by Electro-Science Labs ESL No. 6800–B or Dupont No. 8764. Intermediate insulator layer 16 is typically formed of a high temperature dielectric screening material such as a high temperature glass. It is in the portions 30 and 31 of conductor 18 which rise up and over edges 28 and 26 that the holes occur. The resulting holes 32,34, FIG. 2, at portions 30, 31 may be few or many, small or large depending on the particular circumstances and conditions. The effect may be to increase significantly the resistance of conductor 18 or if there are enough such holes and they are large enough conductor 18 may become an open circuit.

In FIG. 3, where like parts have been shown with like numbers primed, intermediate insulator layer 16′ in accordance with this invention has been provided with serrated edges 26′ and 28′. These serrations 40 are triangular in form and have clean triangular contours 42, steep sides 44 and sharp corners and edges 46. Conductor 14′ and intermediate insulator layer 16′ are formed of the same materials as their counterparts in FIG. 1 which are materials suitable for use in thick film silk screening techniques. These materials are flowable and thus the shape of serrations 40 in FIG. 3 are ideallized, for immediately after the glass material of intermediate isulator layer 16′ is deposited on substrate 12′, serrations 40 will start to slump. As they slump their angular contours 42 become rounded, their steep sides 44 slump and become more gradually sloped and the sharp corners and edges 46 disappear; the result as shown in FIG. 4 where like parts have been given like numbers primed and double primed with respect to FIG. 3 is that serrated edges 26″ and 28″ now have an overall gradual slope due to the slumping of the material in serrations 40 which result in serrations 40′ having rounded contours 42′ and gradually sloped sides 44′. As a result of the slumping of edges 26″ and 28″, FIG. 4, and the gradual slope created about serrations 40′ there are no holes formed on portions 30′ and 31′ where conductor 18′ moves up and over the edges of intermediate insulator layer 16′.

Even though there is some slumping of the intermediate insulator layer material in conventional crossover junctions, the slumping is insufficient to provide a gradual enough slope to prevent the formation of holes in the top conductor. This is so because in conventional junctions the intermediate insulator layer 16 typically has straight edges 26 and 28 on its second and third sections 22 and 24, FIG. 6. Therefore the edges 26 and 28 can only slump in one direction as shown by the arrows 60. Consequently, as shown in FIG. 7, the slumping of edge 28 is quite small and insufficient to significantly reduce the steepness of edge 28.

Figures 6, 7, 8, 9, 10, 11, 12, 13, 14:
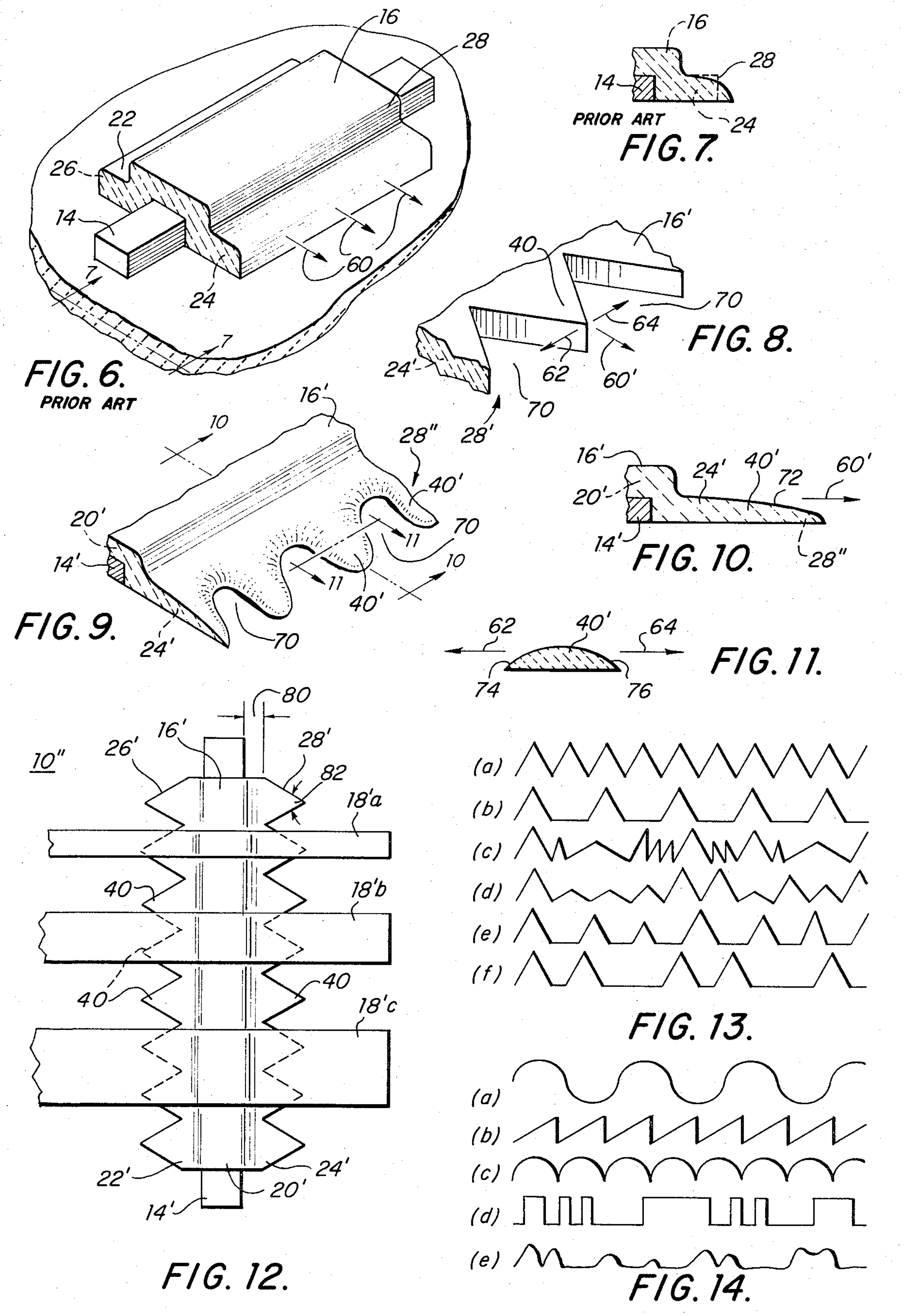
FIG. 6. PRIOR ART, FIG. 7. PRIOR ART, FIG. 8., FIG. 9., FIG. 10., FIG. 11., FIG. 12., FIG. 13., FIG. 14.
FIG. 6 is an axonometric view with some parts shown in cross-section of a portion of a typical crossover junction illustrating the forces tending to make the edge of the intermediate insulator layer slump downward.
FIG. 7 is an enlarged cross-sectional view taken along lines 7—7 of FIG. 6 of a portion of the crossover junction after the intermediate insulator layer has slumped.
FIG. 8 is an axonometric view of a portion of a serrated edge according to this invention illustrating the directions in which one serration can slump.
FIG. 9 is a view of the portion of the serrated edge shown in FIG. 8 after the intermediate insulator layer has slumped.
FIG. 10 is a cross-sectional view taken along lines 10—10 of FIG. 9.
FIG. 11 is a cross-sectional view taken along lines 11—11 of of FIG. 9.
FIG. 12 is a plan view of a triple crossover junction according to this invention.
FIG. 13 (*a–f*) illustrates various forms that the serrated edge may assume with variations in regularity, contiguity and uniformity of the individual serrations according to this invention.
FIG. 14 (*a–e*) illustrates various shapes of individual serrations according to this invention.

However with a serrated edge each serration 40, FIG. 8, is capable of slumping in three directions as shown by arrows 60′, 62 and 64. This means that the outer edges of each serration 40 can collapse or slump to a much greater degree and produce a much more gradual slope at edge 28′ within the same given area. Thus when serrated edge 28′ with serrations 40 slumps to form serrated edge 28″ with serrations 40′, FIG. 9, material can flow or slump in three directions and can fill voids 70 between serrations 40′. The material can slump in three directions to provide a very gradual slope on serrated edge 28″ and yet remain in a given area in as much as the slumping material is accepted in the voids 70. The gradual slope extends both outwardly in the direction of arrows 60′, FIG. 10, as can be seen by the gently sloping contour 72 of serrations 40′ and is also gradually sloping in the direction of arrows 62 and 64, FIG. 11, as can be seen by the gradually sloping contours 74 and 76 of serrations 40′.

In one embodiment a crossover junction 10″, FIG. 12, is shown having a conductor 14′, intermediate insulator layer 16′ and three top conductors 18′*a*, 18′*b*, and 18′*c*. Typically sections 22′ and 24′ of intermediate insulator layer 16′ are 2 mils thick and section 20′ is 3 mils thick including the 1 mil thickness of conductor 14′. In FIG. 12 the distance 80 from the base line of serrations 40 to the edge of conductor 14′ is 0.015 inches and the apex angle 82 of each triangular serration 40 is 90°. In FIG. 12, as in FIGS. 3 and 4, the serrations are regular, uniform and contiguous. They are regular because they have a definite periodicity; they are uniform because each one is the same size and shape; and they are contiguous because each serration abuts a serration on either side of it. But these are not limitations on the serrated edge design according to this invention. For example, as illustrated in FIG. 13, the serrations may be regular, uniform and contiguous, FIG. 13*a;* regular, uniform and not contiguous, FIG. 13*b;* contiguous but neither regular nor uniform, FIG. 13*c;* regular and contiguous but not uniform, FIG. 13*d;* regular but neither contiguous nor uniform, FIG. 13*e;* and uniform but not regular nor contiguous, FIG. 13*f.* In addition, although for purposes of illustration, serrations have been shown heretofore having essentially triangular form, this too is not a limitation of the invention, for, as shown in FIG. 14, the serrations both in the idealized version as screened and in the final version after having slumped, may take the form of, for example, a sine wave, FIG. 14*a;* a sawtooth, FIG. 14*b;* rounded humps, FIG. 14*c;* rectangular blocks FIG. 14*d;* or any combination of such regular shapes as shown in *a*, *b*, *c* and *d* and irregular shapes or combinations of regular, irregular shapes or totally irregular shapes as shown in FIG. 14*e*.

Other embodiments will occur to those skilled in the art and are within the following claims:

What is claimed is:

1. A crossover junction for miniaturized circuit construction including a first conductor mounted on a support layer, an intermediate insulator layer having a first section covering a length of said first conductor in the area of the junction and overlapping on to said support layer to form second and third sections on either side of said first conductor; each of said second and third sections of said intermediate insulator layer having a serrated outer edge, and a second conductor extending along said support layer transverse to said first conductor and extending across said intermediate insulator layer over said serrated edges.

2. The crossover junction of claim 1 in which said serrations are spaced from said first section.

3. The crossover junction of claim 1 in which said serrations are regular.

4. The crossover junction of claim 1 in which said serrations are uniform.

5. The crossover junction of claim 1 in which said serrations are pointed.

6. The crossover junction of claim 1 in which said serrations are formed in the shape of triangles.

7. The crossover junction of claim 1 in which said serrations are triangular with 90° apex angles.

8. The crossover junction of claim 1 in which said serrations are regular and uniform and have a pitch which is generally equal to their height.

9. The crossover junction of claim 1 in which said serrations are contiguous.

* * * * *